United States Patent [19]
Klein et al.

[11] Patent Number: 5,007,686
[45] Date of Patent: Apr. 16, 1991

[54] PROCESS FOR ROUNDING BRISTLE TIPS ON BRUSHES

[75] Inventors: Rolf M. Klein; Reinhart Poprawe, both of Aachen; Gerd W. Herziger, Roetgen-Rott, all of Fed. Rep. of Germany

[73] Assignee: Blendax GmbH, Fed. Rep. of Germany

[21] Appl. No.: 429,740

[22] Filed: Oct. 31, 1989

[51] Int. Cl.$^5$ .............................................. A46D 1/04
[52] U.S. Cl. .................. 300/21; 219/121.66; 219/121.73
[58] Field of Search ......................... 300/2–11, 300/21, 17; 219/121.73, 121.82, 121.85, 121.66; 264/25, 26

[56] References Cited

U.S. PATENT DOCUMENTS

| 4,473,735 | 9/1984 | Steffen . |
| 4,592,594 | 6/1986 | d'Argembeau ...................... 300/21 |
| 4,762,373 | 8/1988 | Amos et al. ......................... 300/21 |

FOREIGN PATENT DOCUMENTS

| 60592 | 9/1982 | European Pat. Off. . |
| 3433763 | 2/1986 | Fed. Rep. of Germany . |
| 3533533 | 9/1986 | Fed. Rep. of Germany . |
| 640448 | 1/1984 | Switzerland . |

*Primary Examiner*—Mark Rosenbaum
*Attorney, Agent, or Firm*—E. Kelly Linman; John V. Gorman; Richard C. Witte

[57] ABSTRACT

Controlled melting of the tips of bristles is achieved by simple means using a pulsed laser beam operating in the kilowatt range and having a pulse duration in the microsecond range.

12 Claims, 2 Drawing Sheets

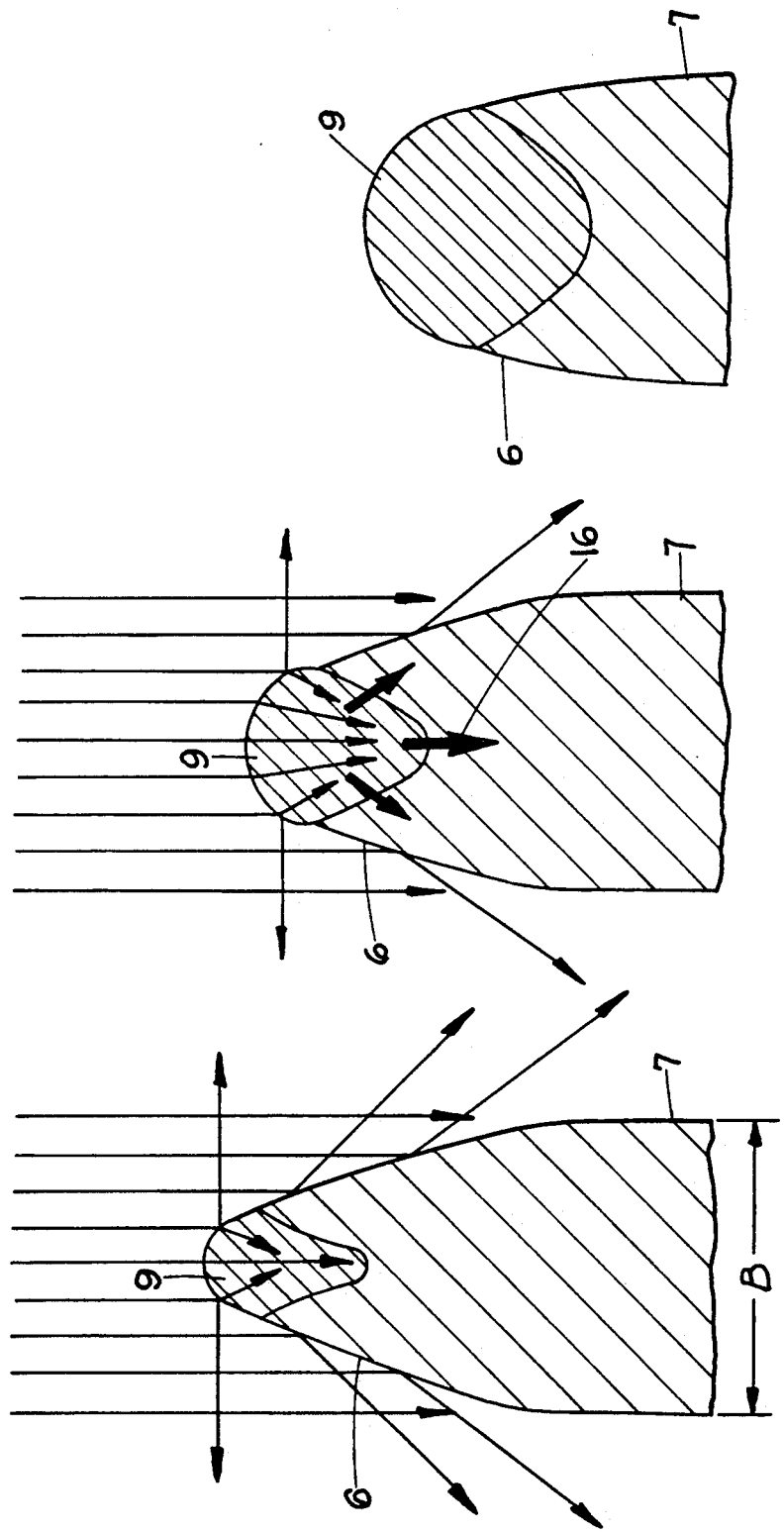

PROCESS FOR ROUNDING BRISTLE TIPS ON BRUSHES

The present invention relates to a method for rounding off the tips of bristles used in brushes and particularly in tooth brushes. It is known that it is desirable to produce many brushes, e.g. tooth brushes, having bristles with rounded tips to provide satisfactory and comfortable use of the brush. The methods presently used for this purpose did not provide satisfactory results in that the control of the rounding operation, usually utilizing the melting of the bristle made of suitable thermoplastic material, was difficult to achieve with desirable accuracy.

In the production of brushes, bundles of bristles are first jammed into the brush head and anchored therein. Then the bristles must be shortened to a predetermined length. This is usually done by milling off the bristle tips. During this operation, the bristle tips can also be graded such that they are of different lengths. After the milling, however, the bristle tips have sharp edges. It is known to remove the sharp edges by rounding the tips by grinding. Yet, a rough surface of the bristle tip still remains at the machined portion of the bristle. It often also includes burr. Furthermore, in the known forms of brushes, for instance V-shaped tooth brushes, there is no satisfactory reproducibility of the brush head after the grinding, which could be used with bristles of different length such as in inclined brush positions.

One of the problems encountered with rounding off bristles made from thermoplastic material was that the uncontrolled melting of the tip portions often resulted in that the bristles stuck together, particularly when there was a close spacing between the bristles. Another disadvantage of the known methods is that the lack of this control resulted in relatively long periods of melting and the breakdown of the plastic. In particular, as a part of this breakdown process, components in the plastic are vaporized and given off, and this results in undesired mechanical deformation of the melt zone at the tip of the bristle.

It is known from European Pat. No. 60592 to round off the ends of thermoplastic brush bristles by laser radiation. In such method, the ends of the bristles are molten so that they assume the shape of a water drop. In order to assure that the soft, molten tips of adjacent bristles to not stick to each other, they are subjected, during the treatment by laser radiation, to suction directed such as to cause extension or stretching of the drop-shape of the tip. Furthermore, it is known from German Pat. No. 3,533,533 to effect the rounding off of the bristle ends in an electrostatic field whose forces are likewise oriented to cause the stretching of the molten bristle ends in order to avoid their sticking to each other.

Thus, in short, the known methods are unsatisfactory as they are relatively expensive and do not allow accurate enough adjustments. It is an object of the present invention to improve the process of rounding off the tips of brush bristles by providing the rounding technique in which the melting of the tips of bristles be controlled in a more efficient way than it was possible to date, while utilizing simple means for performing the method.

In general terms, the present invention provides a method for rounding off the tips of bristles made from thermoplastic material, said method employing a pulsed laser beam operating in the kilowatt range and having a pulse duration in the microsecond range.

The preferred range for the pulsed power is between about 10 kW and 20,000 kW, and in particular between approx. 1,000 kW and approx. 10,000 kW. The preferred pulse duration is between approx. 0.5 and approx. 3 microseconds, and in particular between approx. 0.6 microseconds and approx. 1.2 microseconds.

The number of pulses is 1 to 10, and these are delivered at a pulse repetition frequency of between 1 and 200 Hz, and in particular between 5 and 20 Hz.

It is an important aspect of the invention that the energy required to melt and round off the bristle tips should be controlled with sufficient accuracy. Pulsed laser beams are particularly suitable for this purpose, but it is additionally important that the pulse duration should be kept relatively short. A short pulse duration is important in order to avoid the breakdown of the plastic, which increases with the duration of exposure to the beam. As already mentioned at the outset, as part of this breakdown process, components in the plastic are vaporized and given off, and this results in undesired mechanical deformation of the melt zone at the tip of the bristle. Such deformation is avoided by using a beam of relatively high power, but short pulse duration, to introduce into the bristle tips the amount of energy required to bring about melting. This permits the tips of the bristles to be shaped in a controlled manner without being influenced by any breakdown processes in the plastic.

It is particularly advantageous if brushes having bristles with conically tipped ends are used. In such case, the melting starts at the extreme tip of the bristle because that is where the energy input is greatest and the volume of bristle exposed to the energy input is smallest. Starting from this outermost tip of the bristle, the further progress of the melting process can be controlled as desired, simply by selecting the number of pulses and the pulse repetition frequency.

Advantageously, the tips of the bristles are processed in the upright position with the laser beam oriented parallel to the bristles, so that a uniform energy input is achieved into the bristle tip or into the ends of the bristles.

In order to ensure with certainty that adjacent, in particular closely spaced bristles do not stick together, the pulsed laser beam produces a melt cone at the tip of the bristle which does not exceed the outer diameter of the bristle.

The laser beam is shaped according to the projection plane—running at right angles to the bristles, which plane is generally coincident with all the tips of the bristles; the plane has margins coincident with the margins of the bristle containing area of the brush as viewed in a plan view generally parallel with the elongation of the bristles. This is done in order to restrict the beam action to the area of the brush containing the bristles and to keep the laser beam away from the device transporting the brush.

While the laser beam is acting on it, each brush is fixed so that it is immobile relative to the beam. This offers the specific advantage that the laser is fixed in position and the beam needs to be aligned just once only, while the brush is advanced by simple means in the normal stepwise fashion.

A TEA$CO_2$ laser is used to obtain the desired short processing pulses.

The bristles are pre-dried before being exposed to the laser beam. This is done in order to avoid any effects being caused by the presence of moisture during the rounding off process, e.g. the formation of a water vapour phase which might lead to a roughening of the surface at the tip of the bristle or which might even affect the shaping of the tip of the bristle during the melting process.

The invention will now be explained in greater detail with reference to the accompanying drawings, wherein:

FIGS. 3a to 3c are diagrammatic representations of a bristle on enlarged scale showing the melt process occurring as the tip of a bristle is processed by the laser beam.

Figure 1:
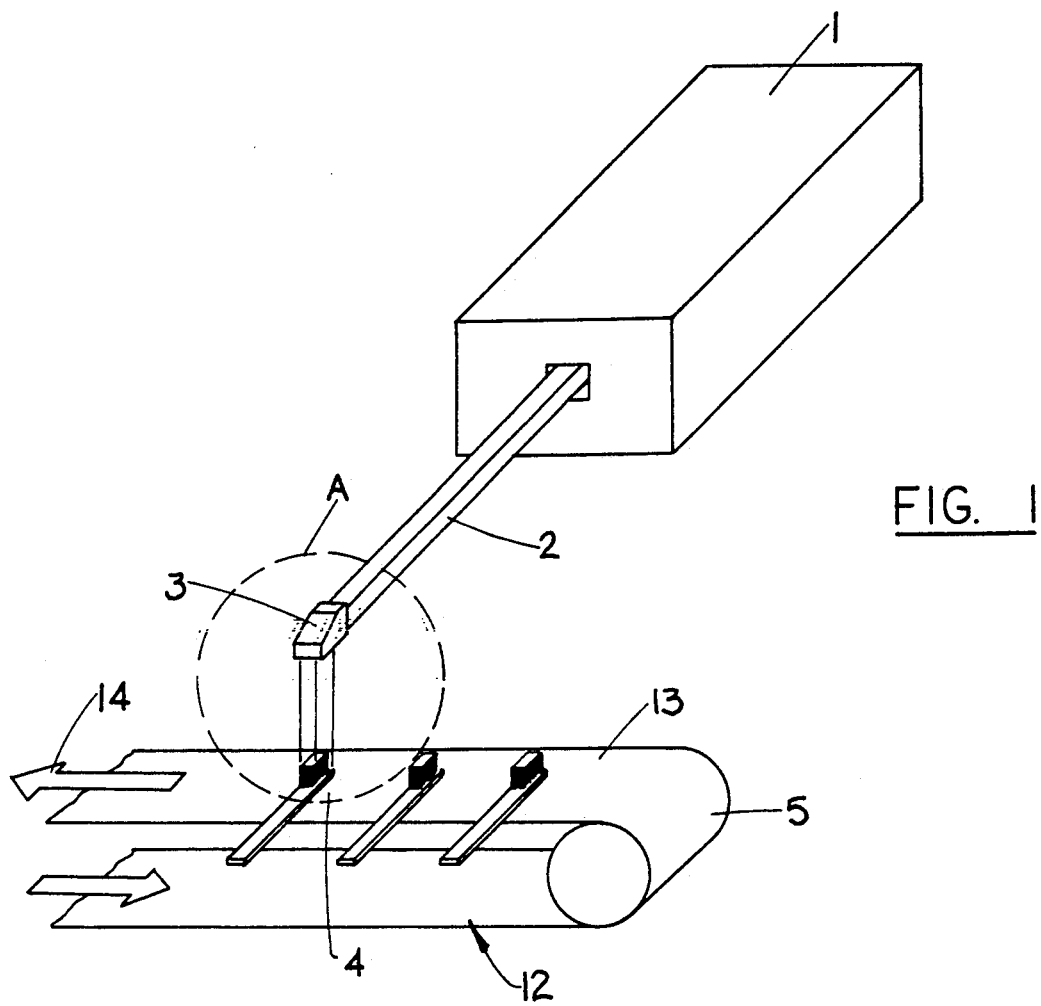
FIG. 1 is a perspective view of a device for rounding off the tips of bristles using a laser beam.
Figure 2:
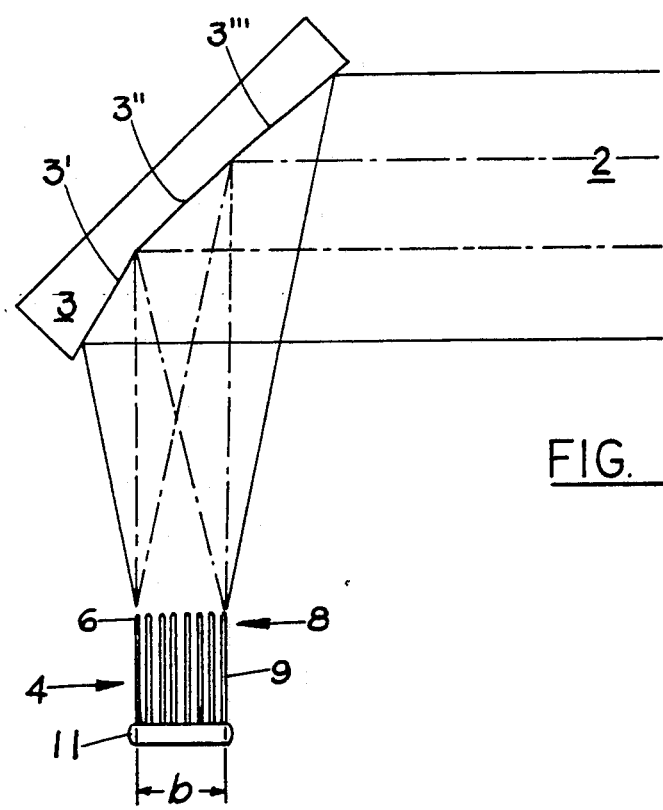
FIG. 2 is detail A of FIG. 1, viewed from the left of FIG. 1.

FIG. 1 shows a laser 1, whose beam 2 is directed by a deflecting mirror 3 onto the bristles 9 of a brush 4. The laser beam 2 is pulsed, and the length and number of the pulses, as well as the repetition frequency, can be controlled in the customary manner by the laser 1.

The beam-deflecting mirror concentrates the laser beam onto that area in which the tips 6 of the bristles of the brush 4 are present. In the example shown, all the tips 6 of the bristles are arranged in a plane 8, and the area occupied by the tips 6 of the bristles is approximately rectangular in shape. The deflecting mirror 3 shows, for example, how the laser beam 2 is formed in such a manner that in the area of the brush 4 its width is restricted to that located in the plane of the drawing. The beam is shaped by the facets 3', 3'', and 3''' which reflect the portion of the laser beam 2 impinging on them onto the respective, crucial bristle field width b, in accordance with their depicted boundary rays. The deflecting mirror 3 is arranged in such a manner that the laser beam is oriented essentially parallel to the bristles, as is shown in FIGS. 3a, b.

To permit the tips of its bristles 6 to be irradiated, the brush 4 is arranged on its back 11 on a conveying device 5 which conveys several brushes 4 one after another into the area of the laser beam 2. The conveying device 5 consists of a conveyor belt 12 on whose upper run 13 several brushes 4 are arranged at a certain spacing from each other so that when the conveyor belt 12 is in motion they are transported in the direction indicated by the arrows 14. The conveying process is accomplished in such a manner that the conveying device 5 or the motion of the conveyor belt 12 is stopped when a measuring device, not shown in the drawing, detects a brush 4 correctly oriented in relation to the laser beam 3; that is to say, the beam cross section coincides in a predetermined manner with the projection plane—running parallel to the bristles—of all the tips of the bristles 6.

According to the predetermined arrangement of a brush 4, the rounding of the tips of the bristles 6 is accomplished by causing them to undergo partial melting. During this processing step no relative motion occurs between the brush 4 and the laser beam 2. Once the tips of the bristles have been shaped, the brushes are sent on for further processing, e.g. packaging.

The stepwise transportation of the brushes 4 by the transportation mechanism 5 is matched to the action of the laser 1, i.e. it takes account of the timing sequence of the pulsed operation. It is also possible to switch the laser 1 on and off as a function of the conveying of the brushes on the conveying device 5.

The bristle 7 is given a pointed tip as shown in FIG. 3a. That is to say, the end 6 of the bristle is given a conically shaped tip. The bristle end 6 or all bristle ends 6 on a brush 4 are pre-ground to a sharp tip of this shape by pressing the ends of the bristles against a grinding wheel which executes oscillatory grinding movements. By appropriately selecting the pressure on the brush and the radius of the grinding motion, it is possible to achieve the desired tip at the end of the bristles.

When laser processing of the tips of the bristles 6 commences, the beam strikes the tips in an orientation parallel to the bristle, as shown in FIG. 3a, and initially it causes the extreme tip of the bristle 6 to melt, thus forming a melt cone 9. The latter extends inwards as shown in the diagram, because the energy input is highest at the tip and greater energy-depleting reflection occurs at the outer surfaces lower down on the end of the bristle 6. The energy input via the melt cone 9 is so effective that the further melting of the tip of the bristle 6, in accordance with FIG. 3b, proceeds essentially from this melt cone 9. This is indicated by the bold arrows 16. The tips of the bristles 6 are processed by a large number of laser pulses until the melt cone has acquired the shape shown in FIG. 3c, in which the tip of the bristle is rounded off in a predetermined manner. By suitably selecting the number of laser pulses and/or the duration of the pulses and/or the spacing between the pulses, it is possible to produce a melt cone 9 which does not exceed the outer diameter B of the bristle 7. Thus there is no danger of adjacent bristles becoming stuck together, even if they are closely spaced.

In order to prevent any moisture, which is present due to the hygroscopic action of the plastic, from adversely affecting the melt cone 9 formed by processing the tips of the bristles 6 with a laser beam, the aqueous components of the material are eliminated by pre-drying the bristles 7. This holds true, for example, if a polyamide material, e.g. PA 612, is used for the bristles. The laser 1 consists, for example, of a TEACO$_2$ laser, i.e. a Transverse Excited Atmospheric (Pressure) Carbon Dioxide laser which is excited in the microsecond range; that is to say it can generate correspondingly short pulses of, for example, less than a microsecond. The power of such lasers extends into the kilowatt range so that the power output of this laser while shaping a bristle tip for a maximum of one microsecond is, for example, in excess of 10 kilowatts. The tips of bristles 6 have been very satisfactorily rounded off by the described process.

Those skilled in the art will appreciate that many modifications of the described method my exist without departing from the gist of the present invention. Accordingly, we wish to protect by Letters Patent which may issue on this application all such embodiments as reasonably fall within the scope of our contribution to the art.

The embodiments of the invention in which an exclusive right or privilege is claimed are defined as follows:

1. A process for rounding off the tips of bristles used in brushes and made of thermoplastic material said process comprising subjecting said tips of said bristles to a pulsed laser beam operating in the kilowatt range and having a pulse duration in the microsecond range.

2. The process of claim 1, wherein the tips of the bristles to be rounded are conically shaped prior to being subjected to said pulsed laser beam.

3. The process of claim 1, wherein said tips of said bristles are processed while said bristles are in the upright position, and wherein said laser beam is oriented essentially parallel to said bristles.

4. The process of any of claims 1, 2 or 3, wherein said pulsed laser produces a melt cone not exceeding the outer diameter of the bristle at the tip of said bristle.

5. The process of any of claims 1, 2 or 3, wherein said laser beam is shaped coincident with the tips of said bristles to restrict it to the area of said bristles only.

6. The process of any of claims 1, 2 or 3, wherein each brush in which said bristles are secured remains immobile relative to said laser beam while said bristle tips in said brush are being subjected to the action of said laser beam.

7. The process of any of claims 1, 2 or 3, wherein a TEACO$_2$ laser is used to produce said pulsed laser beam.

8. The process of any of claims 1, 2 or 3, wherein said bristles are pre-dried before their tips are acted upon by said laser beam.

9. A process for rounding off the tips of bristles used in brushes and made of thermoplastic material, said process comprising subjecting said tips of said bristles to a pulsed laser beam operating in the range of about 10 kilowatts to about 20,000 kilowatts and having a pulse duration in the range of about 0.5 to about 3 microseconds.

10. The process of claim 9, wherein about one and about ten laser pulses are applied to each of said bristle tips to produce rounding thereof.

11. The process of claim 10, wherein said laser pulses are applied at a repetition frequency of between about one and about 200 Hz.

12. The process of claim 10, wherein said pulsed laser beam is operating in the range of about 1,000 kilowatts to about 10,000 kilowatts, said pulse duration is in the range of about 0.6 and about 1.2 microseconds and said repetition frequency of said laser pulses is in the range of about five and about 20 Hz.

* * * * *

UNITED STATES PATENT AND TRADEMARK OFFICE
CERTIFICATE OF CORRECTION

PATENT NO. : 5,007,686
DATED : April 16, 1991
INVENTOR(S) : Rolf M. Klein; Reinhart Poprawe; Gerd W. Herziger It is certified that error appears in the above-identified patent and that said Letters Patent is hereby corrected as shown below:

Column 1, line 48, "to" should read -- do -- .

Column 4, line 51, "my" should read -- may -- .

Claim 10, line 8, after "wherein" insert -- between -- .

Signed and Sealed this

Twenty-fifth Day of August, 1992

Attest:

DOUGLAS B. COMER

*Attesting Officer*      *Acting Commissioner of Patents and Trademarks*